United States Patent
Takano et al.

(10) Patent No.: US 8,416,649 B2
(45) Date of Patent: Apr. 9, 2013

(54) MAIN POLE DESIGN FOR THERMALLY ASSISTED MAGNETIC RECORDING

(75) Inventors: Kenichi Takano, Santa Clara, CA (US); Joe Smyth, Aptos, CA (US); Erhard Schreck, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 213 days.

(21) Appl. No.: 12/800,194

(22) Filed: May 11, 2010

(65) Prior Publication Data

US 2011/0279920 A1    Nov. 17, 2011

(51) Int. Cl.
*G11B 11/00* (2006.01)
(52) U.S. Cl. .............. 369/13.33; 369/13.13; 369/112.27
(58) Field of Classification Search .............. 369/13.33, 369/13.32, 13.24, 13.14, 13.03, 13.02, 13.12, 369/112.27, 112.09, 112.01, 13.13, 13.01, 369/13.35, 13.17; 360/59, 125.31, 125.74
See application file for complete search history.

(56) References Cited

U.S. PATENT DOCUMENTS

| | | | |
|---|---|---|---|
| 6,813,115 B2 * | 11/2004 | Van der Heijden et al. | 360/125.12 |
| 7,038,881 B2 | 5/2006 | Ito et al. | |
| 7,532,433 B2 | 5/2009 | Kawato et al. | |
| 7,948,716 B2 * | 5/2011 | Matono et al. | 360/319 |
| 8,036,069 B1 * | 10/2011 | Jin et al. | 369/13.32 |
| 2004/0233578 A1 | 11/2004 | Gao | |
| 2009/0116145 A1 | 5/2009 | Guan et al. | |
| 2009/0207525 A1 | 8/2009 | Guan et al. | |
| 2011/0181979 A1 * | 7/2011 | Jin et al. | 360/59 |
| 2012/0008229 A1 * | 1/2012 | Zhou et al. | 360/59 |

* cited by examiner

*Primary Examiner* — Ali Neyzari
(74) *Attorney, Agent, or Firm* — Saile Ackerman LLC; Stephen B. Ackerman

(57) ABSTRACT

Improved spatial resolution during TAMR has been achieved by shaping the write pole to have a lower surface that slopes away from the surface of the recording medium, starting at, or near, the pole's leading edge. The approach may be used for simple or compound (stitched) poles.

16 Claims, 6 Drawing Sheets

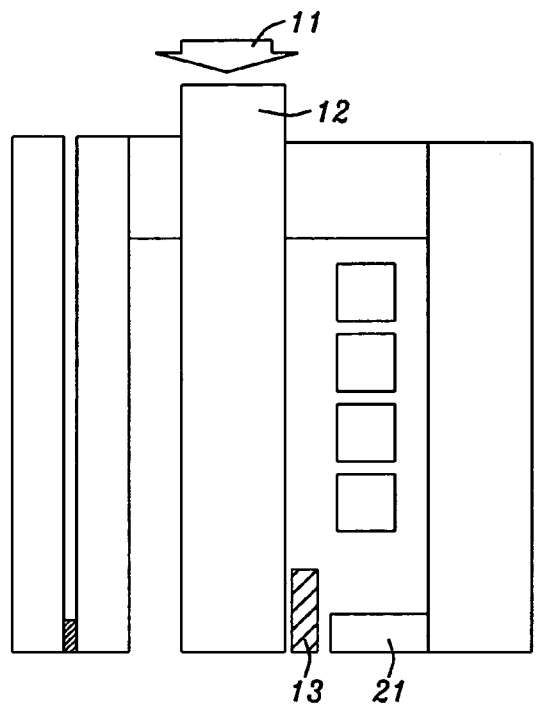
FIG. 1 - Prior Art
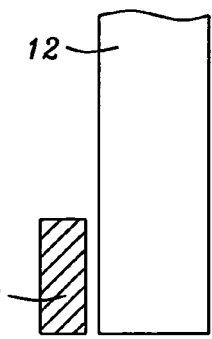
FIG. 2a
Prior Art
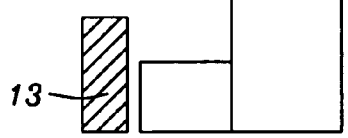
FIG. 2b
Prior Art
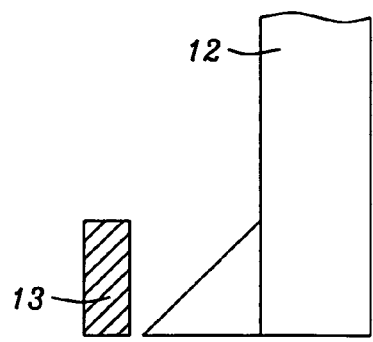
FIG. 2c
Prior Art

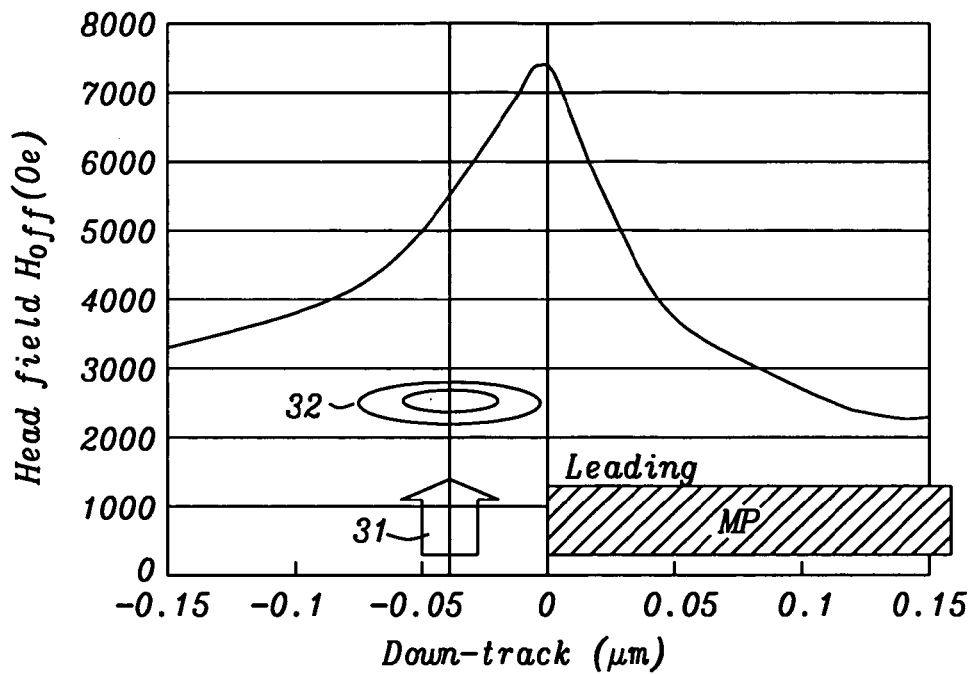
FIG. 3
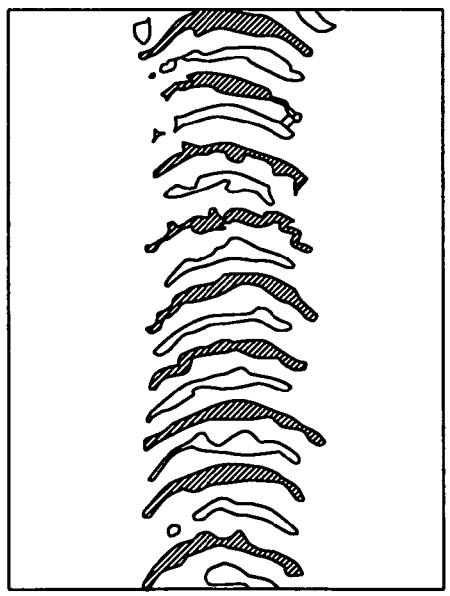
FIG. 4 – Prior Art

MAIN POLE DESIGN FOR THERMALLY ASSISTED MAGNETIC RECORDING

FIELD OF THE INVENTION

The invention relates to the general field of magnetic recording with particular attention to achieving high storage density through a local reduction of the recording medium's coercivity during recording, including improved alignment between the main pole and the plasmon generator.

BACKGROUND OF THE INVENTION

Perpendicular magnetic recording (PMR) heads, combined with a double-layered recording medium, have made it possible to extend the ongoing increase of the recording density in hard disk drives (HDD) beyond 100 Gb/in$^2$. However as the track width shrinks, the write field decreases due to the small pole area and pole tip saturation if head-media spacing reduction cannot be suitably applied. This situation makes it difficult to achieve 1 Tb/in$^2$. In addition, a small grain size for the recording media is required to achieve these higher recording densities. However, conventional solutions to this problem tend not to be compatible with thermal stability. Two anticipated obstacle to further areal density growth are lack of a proper head field and dealing with the media's super-paramagnetic limit.

Fortunately, new technology options are currently being explored that promise areal density growth beyond these limits. Thermally assisted magnetic recording (TAMR) is the most promising of these technologies. Bit patterned magnetic recording (BPMR) is too expensive and the manufacturing throughput is very slow. Microwave assisted magnetic recording (MAMR) is one of the candidates but its effect is too small to increase current recording densities. Additionally it is incompatible with high anisotropy media.

FIG. 1 shows a TAMR head configuration of the prior art. Laser diode 11 illuminates the inlet of optical waveguide 12, sending light through it to couple with plasmon generator 13. This enables light in plasmon mode to be emitted at the surface or edges of plasmon generator 13. Finally, a near field spot appears at the tip of the plasmon generator's air bearing surface (ABS). This tiny near field spot induces a very localized temperature rise in the recording media.

Since the media coercivity field decreases with increasing temperature, TAMR enables magnetic recording to be achievable in a medium whose coercivity is too large for recording at room temperature. However, precise alignment of the thermal spot and the head field is critical for TAMR recording to be successful.

FIGS. 2a-2c are schematic illustrations of three conventional plasmon generator/main-pole configurations currently in use for TAMR. Plasmon generator 13 is located on the leading side of the main-pole 21's leading edge at a distance of 10-60 nm therefrom. In this configuration, the center of the thermal spot is not directly under the main-pole. However the head field negative slope is inside of the main-pole.

FIG. 3 is a down-track profile of the head field in relation to main-pole 21, optical spot 31, and thermal spot 32. The head field H$_{eff}$ is defined in equation (1) below:

$$H_{eff} = (H_{in}^{2/3} + H_y^{2/3})^{3/2} \quad (1)$$

where H$_{in}$ is the in-plane field and H$_y$ is the perpendicular component of the head field at 17.5 nm from the ABS.

The thermal spot diameter should be less 100 nm, with 50 nm or less being preferred. Even when the spot center is located only 40 nm from the main-pole, the thermal spot's trailing edge will still be outside or, at best, barely at the main-pole edge. At this point, the recording transition takes place since the head field gradient now turns negative. As a result, even in TAMR recording, the transition quality is very poor and shows severe transition curvature in conventional TAMR heads. This is because the transition is basically defined by the media anisotropy gradient (which follows the temperature profile) rather than by the head field gradient.

FIG. 4 is a computed media-recording pattern for a conventional TAMR head at 2000 kFCI (Kilo Flux Changes per Inch) linear density. The transition shows severe curvature and the signal to nose ratio (SNR) is poor at only 5.52 dB. Because of this, the behavior of TAMR, as currently implemented, is dominated by thermal factors.

A routine search of the prior art was performed with the following references of interest being found:

Tapered poles of various shapes are described in the prior art. Some examples are: U.S. Pat. No. 7,532,433 (Kawato et al), U.S. Patent Application 2009/0207525 (Guan et al—Headway), U.S. Patent Application 2009/0116145 (Guan et al—Headway), U.S. Patent Application 2004/0233578 (Gao), and U.S. Pat. No. 7,038,881 (Ito et al). None of these show the particular features, that we will disclose below, that would render them suitable for plasmon-based TAMR.

SUMMARY OF THE INVENTION

It has been an object of at least one embodiment of the present invention to increase storage density on a magnetic hard drive.

Another object of at least one embodiment of the present invention has been to temporarily reduce the coercivity of the recording medium in a spot close to the main pole.

Still another object of at least one embodiment of the present invention has been to reduce the separation between this spot and the main pole.

A further object of at least one embodiment of the present invention has been that the point where the head field is a maximum be inside this spot.

These objects have been achieved by shaping the write pole to have a lower surface that slopes away from the surface of the recording medium, starting at, or near, the pole's leading edge. The approach may be used for simple or compound (stitched) poles. The net effect of using this shape is that the peak of the head field is now located within the hot spot generated by the plasmon generator (instead of just outside it).

BRIEF DESCRIPTION OF THE DRAWINGS

FIG. 1. Conventional TAMR head configuration.

FIGS. 2a-c. Conventional TAMR head configurations for optical plasmon generator and magnetic main-pole.

FIG. 3. Down-track profile of head field for conventional TAMR head

FIG. 4. 2000 kFCI TAMR recording pattern on TAMR media by a conventional TAMR head.

DESCRIPTION OF THE PREFERRED EMBODIMENTS

Figure 5:
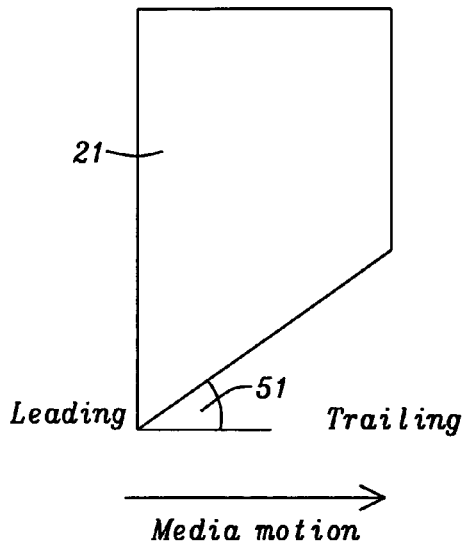
FIG. 5. A commonly used embodiment of the Invention.

The key features of the TAMR head of the present invention are embodied in the example shown in FIG. 5. In particular, starting at, or very close to, its leading edge the main-pole is tapered at angle 51 so that its distance from the ABS gradually increases as the trailing edge is approached.

Figure 6:
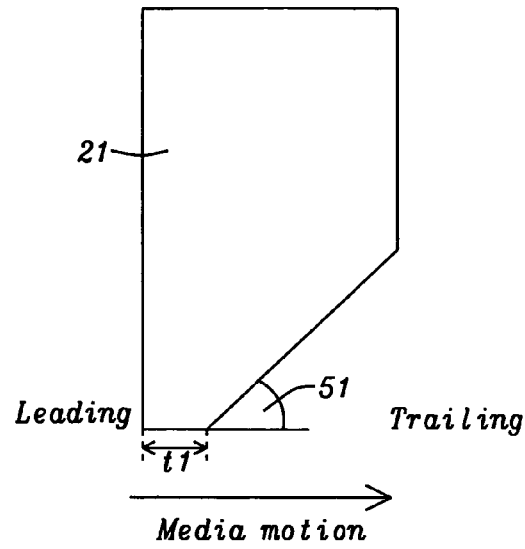
FIG. 6. A more general version of the embodiment shown in FIG. 5.

In order to determine just how close to the leading edge tapering should begin, the structure illustrated in FIG. 6 was investigated. The dimensions of interest in FIG. 6 are distance t1 from the main pole's leading edge at which tapering begins and the taper angle itself.

Figure 7:
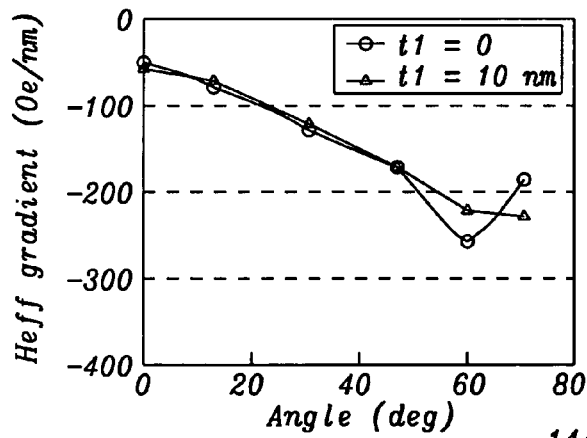
FIG. 7. Head field gradient as a function of the taper angle.

FIG. 7 displays the head field gradient in Oe/nm as a function of the of the taper angle, for t1=0 and t1=10 nm. The data indicates that the minimum head field gradient is obtained for t1=0 for a taper angle between about 55 and 65 degrees.

Figure 8:
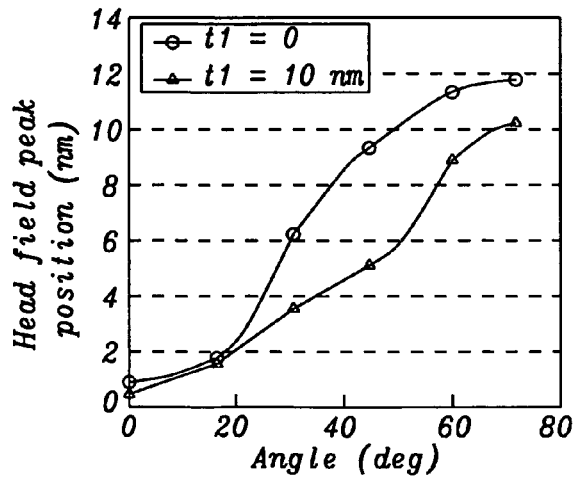
FIG. 8. Head field peak position from the main-pole leading edge as a function of the taper angle.

FIG. 8 displays the distance from the main pole's leading edge at which the head field peaks, as a function of the taper angle, for t1=0 and t1=10 nm. Ideally, this peak field will occur at the center of the thermal spot produced by the plasmon generator. The data indicates that, starting at an angle of about 20 degrees, the field's peak distance increases in correspondence with the taper angle but is about 2 nm greater for the t1=0 case at a taper angle of about 60 degrees.

Figure 9:
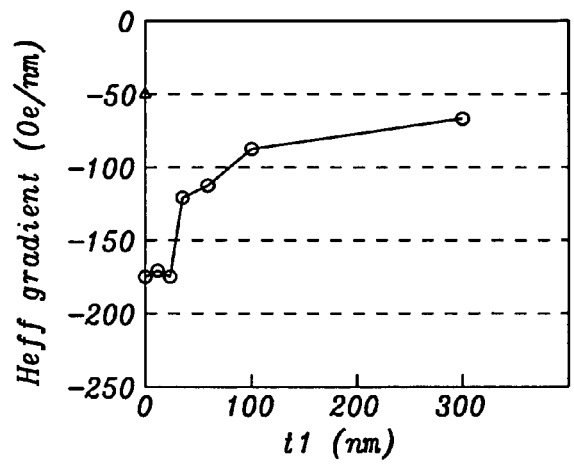
FIG. 9. Head field gradient as a function of the thickness t1.

FIG. 9 plots the head field gradient as a function of the thickness t1, for the taper angle of 45 degrees. When t1 is 20 nm or below, the gradient does not change and provides very large magnitude of −175 Oe/nm but if t1 increases above 30 nm, the head field gradient degrades. Even if t1 is 100 nm or more, the field gradient is still better than in a conventional TAMR head of 50 Oe/nm.

Figure 10:
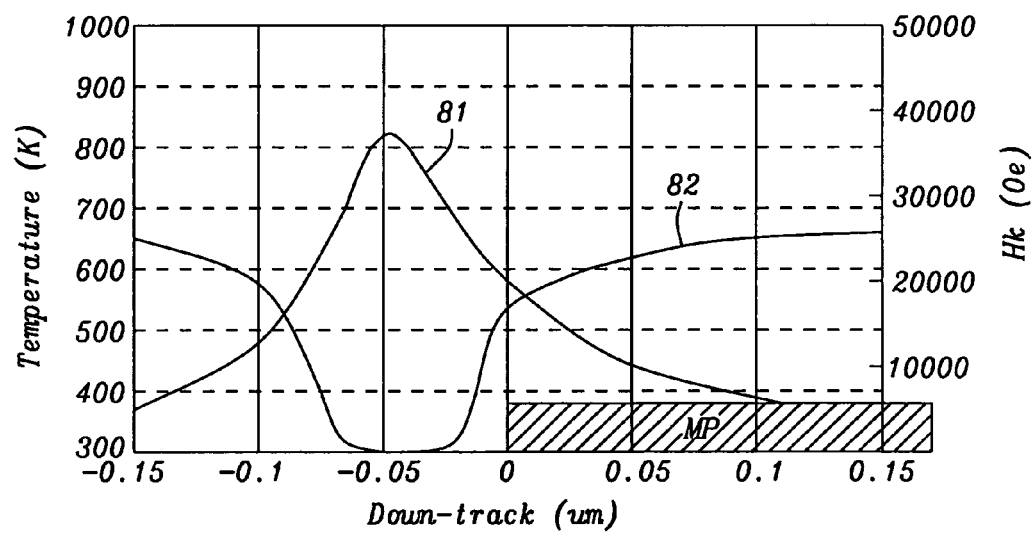
FIG. 10. Temperature and anisotropy field of the recording medium during plasmon irradiation.

FIG. 10 plots the temperature of the recording medium (curve 81) as well as its anisotropy field $H_k$ (curve 82) during TAMR. A region where the media has zero anisotropy field (corresponding to a temperature of about 700 K or greater) can be seen to begin at about 20 nm ahead of the main pole. At this distance the head field of the invented main pole can be seen to be greater negative field gradient than that of a conventional TAMR head, this difference remaining essentially the same until the media's anisotropy field begins to increase again about 30 nm further up track.

Figure 11:
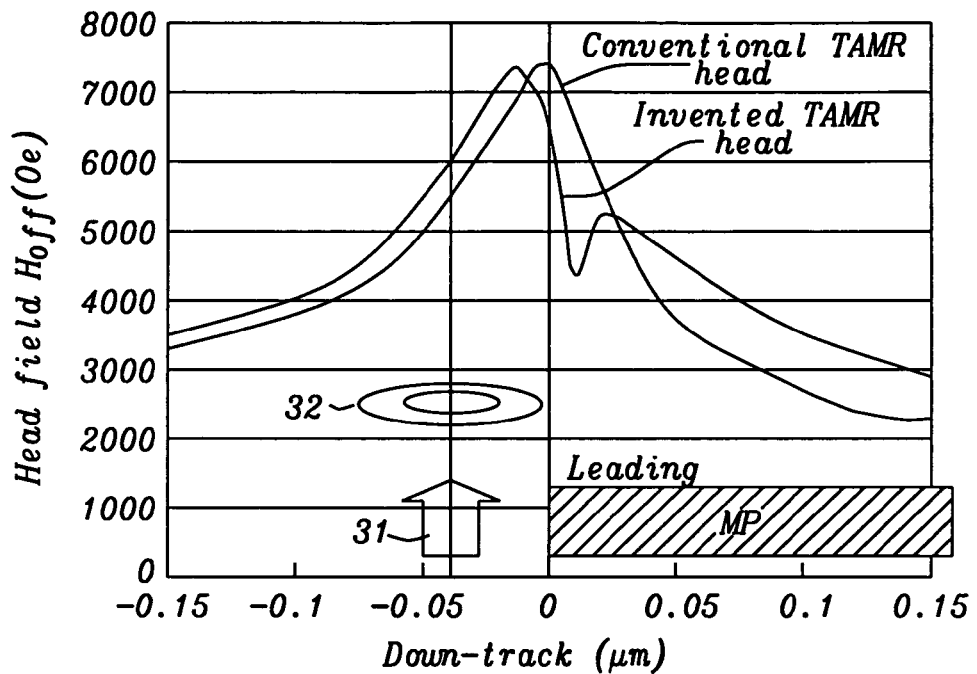
FIG. 11. Down-track profiles of conventional and invented TAMR heads.

FIG. 11 shows how, in the present invention, the peak of the head field lies within the optical (i.e. thermal) spot, which is not the case for the prior art design. This feature thus provides better alignment between the thermal spot and head field. Accordingly, the head field gradient is negative at the main-pole leading edge. In addition, the slope is much sharper than the conventional TAMR head.

Figure 12:
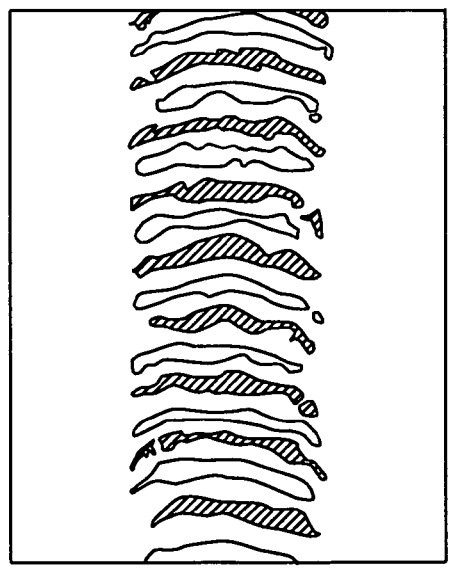
FIG. 12. 2000 kFCI TAMR recording pattern by the invented TAMR head.

FIG. 12 shows a computed media-recording pattern for the invented TAMR write head. The conditions are the same as for FIG. 4 except for the main-pole structure. As can be seen, the transition areas are not as sharply curved as those of the prior art design, implying better transition quality. This is reflected in the signal-to-noise ratio (SNR), which is 11.93 dB, while the SNR of the conventional TAMR head is 6.41 dB. Note the improvement over the 5.52 dB FIGURE quoted earlier. This is because of the reduced noise associated with the sharper transition.

Finally, we note that the above description of the invention has been limited to one-piece write heads. It is, however, possible to apply the principles of the invention to stitched poles. In general, a stitched pole is more expensive to fabricate but it offers the following advantages over a non-stitched pole:

In TAMR heads, the main-pole dampens the transmission of plasmons at the plasmon generator and degrades the light propagation of the waveguide. So, to maximize optical efficiency, the main-pole should be located at a sufficient distance (100 nm or more) from the waveguide and the plasmon generator. However, the plasmon generator must be set as close as possible to the main-pole tip at the ABS in order to optimize thermal and magnetic field alignment during TAMR recording. A stitched-pole enables the write field and the thermal spot to be set close to one another while still retaining adequate separation between the main pole body and the waveguide and plasmon generator.

Figure 13A:
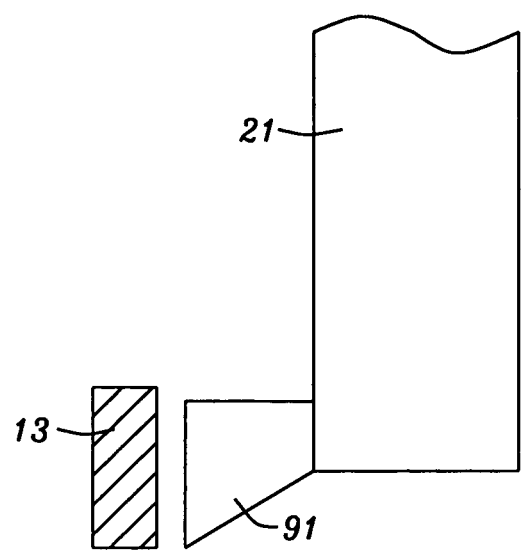
FIGS. 13*a-b*. Examples of stitched main-poles based on the invention.
Figure 13B:
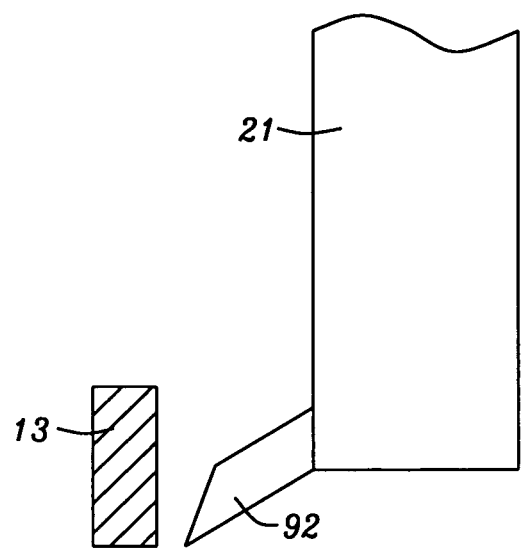

Two examples of stitched poles shaped according to the teachings of the present invention are shown in FIGS. 13*a* and 13*b* (designated 91 and 92 respectively). In both examples (as was the case for one-piece poles), tapering away from the ABS (i.e. increasing the pole's distance from the ABS) begins where the pole is closest to the plasmon generator.

What is claimed is:

1. A method to improve Thermally Assisted Magnetic Recording (TAMR), comprising:

providing a single magnetic pole perpendicularly disposed relative to a magnetic recording medium having a first surface;

shaping said single magnetic pole to have a planar leading surface that is perpendicular to said first surface;

locating a plasmon generator parallel to, and at a first distance, that is in a range of from 10 to 60 nm, from, said leading surface;

said plasmon generator serving to generate a hot spot at said first surface;

further shaping said single magnetic pole to have an air bearing surface (ABS) that extends away from said leading surface to a terminating edge whose distance t1 from said leading edge is no more than 50 nm;

still further shaping said single magnetic pole to have a trailing surface that begins at said terminating edge and that angles away from said first surface at an angle that is in a range of from 30 to 70 degrees relative to the ABS; and thereby causing a peak in a magnetic field generated by said single magnetic pole to lie within said hot spot.

2. The method recited in claim 1 wherein said distance t1 is zero.

3. The method recited in claim 1 wherein said ABS is between 1 and 15 nm from said first surface.

4. The method recited in claim 1 wherein said plasmon generator emits plasmon radiation having a wavelength in a range of from 500 to 1400 nm.

5. A method to improve Thermally Assisted Magnetic Recording (TAMR), comprising:

providing a compound magnetic pole that further comprises a main pole, perpendicularly disposed relative to a magnetic recording medium having a first surface, and a stitched pole that is magnetically connected to said main pole;

shaping said stitched pole to have upper and lower surfaces, that extend away from said main pole, and a leading surface that connects said upper and lower surfaces at upper and lower edges, respectively, while also being perpendicular to said first surface;

said upper surface being parallel to said first surface, and said lower surface sloping away from both said leading surface and said first surface at an angle relative to said first surface that is in a range of from 30 to 70 degrees;

providing a plasmon generator that is parallel to said main pole and that is located a minimum distance of from 10 to 60 nm from said stitched pole; and said plasmon generator serving to generate a hot spot at said first surface whereby a peak in a magnetic field generated by said compound magnetic pole lies within said hot spot.

6. The method recited in claim 5 wherein said lower edge is between 100 and 1000 nm from said main pole.

7. The method recited in claim 5 wherein said lower surface extends away from said main pole for a longer distance than does said upper surface, whereby said leading surface lies at an angle of between 45 to 80 degrees relative to said first surface and said lower surface slopes away from both said leading surface and said first surface at an angle relative to said first surface that is in a range of from 30 to 70 degrees.

8. The method recited in claim 7 wherein said lower edge is between 100 and 1000 nm from said main pole.

9. A perpendicular write head for Thermally Assisted Magnetic Recording (TAMR), comprising:

a single magnetic pole perpendicularly disposed relative to a magnetic recording medium having a first surface;

said single magnetic pole having a planar leading surface that is perpendicular to said first surface;

said single magnetic pole having an air bearing surface (ABS) that extends away from said leading surface to a terminating edge whose distance $t1$ from said leading edge is no more than 50 nm;

a plasmon generator parallel to, and at a first distance, that is in a range of from 10 to 60 nm, from, said planar leading surface; and said single magnetic pole to having a trailing surface that begins at said terminating edge and then angles away from said first surface at an angle that is in a range of from 30 to 70 degrees relative to the ABS.

10. The perpendicular write head described in claim 9 wherein said distance $t1$ is zero.

11. The perpendicular write head described in claim 9 wherein said ABS is between 1 and 15 nm from said first surface.

12. The perpendicular write head described in claim 9 wherein plasmon generator emits plasmon radiation having a wavelength in a range of from 500 to 1400 nm.

13. A perpendicular write head for Thermally Assisted Magnetic Recording (TAMR), comprising:

a compound magnetic pole that further comprises a main pole, perpendicularly disposed relative to a magnetic recording medium having a first surface, and a stitched pole that is magnetically connected to said main pole;

said stitched pole having upper and lower surfaces, that extend away from said main pole, and a leading surface that connects said upper and lower surfaces at upper and lower edges, respectively;

a plasmon generator that generates a hot spot at said first surface, parallel to and at a distance in a range of from 10 to 60 nm from, said leading surface;

said leading surface being perpendicular to said first surface, said upper surface being parallel to said first surface, and said lower surface sloping away from both said leading surface and said first surface at an angle relative to said first surface that is in a range of from 30 to 70 degree, whereby a peak in a magnetic field generated by said single magnetic pole lies within said hot spot.

14. The perpendicular write head described in claim 13 wherein said lower edge is between 100 and 1000 nm from said main pole.

15. The perpendicular write head described in claim 13 wherein said lower surface extends away from said main pole for a longer distance than does said upper surface, whereby said leading surface lies at an angle of between 45 to 80 degrees relative to said first surface and said lower surface slopes away from both said leading surface and said first surface at an angle relative to said first surface that is in a range of from 30 to 70 degrees.

16. The perpendicular write head described in claim 13 wherein said lower edge is between 100 and 1000 nm from said main pole.

* * * * *